(12) United States Patent
Kassler

(10) Patent No.: US 8,104,375 B2
(45) Date of Patent: Jan. 31, 2012

(54) DIFFERENTIAL GEAR UNIT FOR MOTOR VEHICLES COMPRISING AN ACTIVE CONTROL MECHANISM FOR THE DRIVING FORCE DISTRIBUTION

(75) Inventor: Helmut Kassler, Voitsberg (AT)

(73) Assignee: Magna Steyr Fahrzeugtechnik AG & Co KG, Graz (AT)

( * ) Notice: Subject to any disclaimer, the term of this patent is extended or adjusted under 35 U.S.C. 154(b) by 658 days.

(21) Appl. No.: 11/816,939

(22) PCT Filed: Feb. 24, 2006

(86) PCT No.: PCT/AT2006/000084
§ 371 (c)(1),
(2), (4) Date: Jan. 15, 2009

(87) PCT Pub. No.: WO2006/089334
PCT Pub. Date: Aug. 31, 2006

(65) Prior Publication Data
US 2009/0131210 A1    May 21, 2009

(30) Foreign Application Priority Data
Feb. 25, 2005    (AT) .............................. GM112/2005 U

(51) Int. Cl.
*F16H 33/00*    (2006.01)
(52) U.S. Cl. ....................................................... 74/640
(58) Field of Classification Search .................. 475/169,
475/175, 176, 177, 203, 204, 205, 221, 225;
74/640
See application file for complete search history.

(56) References Cited

U.S. PATENT DOCUMENTS

| 773,227 | A | 10/1904 | Robinson |
| 1,358,547 | A | 11/1920 | Herman et al. |
| 1,619,127 | A | 3/1927 | Jeffries |
| 4,825,726 | A * | 5/1989 | Schofield ...................... 475/174 |
| 5,370,588 | A | 12/1994 | Sawase et al. |
| 6,582,337 | B2 * | 6/2003 | Bowen et al. ................. 475/177 |
| 7,037,231 | B2 * | 5/2006 | Showalter ..................... 475/222 |
| 2004/0116232 | A1 * | 6/2004 | Lawson, Jr. ................... 475/204 |
| 2005/0026732 | A1 | 2/2005 | Krisher et al. |

FOREIGN PATENT DOCUMENTS
FR    2 574 867    6/1986
JP    6227272    8/1994
* cited by examiner

*Primary Examiner* — David D Le
*Assistant Examiner* — Michael Gonzalez
(74) *Attorney, Agent, or Firm* — Bachman & LaPointe, P.C.

(57) ABSTRACT

A differential gear unit for motor vehicles comprises a housing and, therein, a differential gear mechanism (8), two coaxial gear mechanisms and two controllable friction clutches, the coaxial gear mechanisms transmitting an additional torque to one or other axle shaft according to the degree of engagement of the friction clutches. In order for it also to be possible for very high forces to be absorbed in long-term operation with very low installation space and wear, the coaxial gear mechanisms have in each case one internal gear which is connected fixedly in terms of rotation to one side of the associated friction clutch, and one sun gear which is connected fixedly in terms of rotation to the respective output element, and the second element of each coaxial gear mechanism is a sun gear, and a third element is configured as an annular gear which has an external toothing system which meshes with the first element and an internal toothing system which meshes with the second element.

6 Claims, 3 Drawing Sheets

DIFFERENTIAL GEAR UNIT FOR MOTOR VEHICLES COMPRISING AN ACTIVE CONTROL MECHANISM FOR THE DRIVING FORCE DISTRIBUTION

BACKGROUND OF THE INVENTION

The invention relates to a differential gear unit for motor vehicles, comprising a housing and, therein, a differential gear mechanism, two coaxial gear mechanisms and two controllable friction clutches, the differential gear mechanism comprising an element which can be driven (for example, a differential cage) and a first and second output element, for example the axle shafts, the coaxial gear mechanisms transmitting an additional torque to the first and second output elements according to the position of the friction clutches.

Units of this type permit active motive power distribution control between the two output elements. The coaxial gear mechanism brings about a step-up or a step-down transmission ratio, with the result that the additional motive power can be metered via the controllable friction clutch to the respective output elements depending on the driving situation. Experts call this "torque vectoring".

A differential gear unit of the generic type is known from U.S. Pat. No. 5,370,588. In said differential gear unit, the coaxial gear units are equipped with double planets instead of internal gears, and are connected fixedly in terms of rotation to in each case one side of the clutch. This type of construction requires a considerable installation width, which is unfavorable, however, in particular if homokinetic joints adjoin the axle shafts. The coaxial gear mechanism is a fixed-axle gear mechanism, the input and output elements of which are coaxial.

Furthermore, a differential gear unit of this type comprises a very large number of components which are difficult to mount and are loaded highly, and the lubrication/cooling of the clutch which is accommodated deep in the interior of the housing is critical. In the case of insufficient cooling, the friction clutch cannot be operated with slip for a relatively long time. Its use value is therefore greatly limited.

SUMMARY OF THE INVENTION

It is therefore an object of the invention to develop a differential gear unit of the generic type in such a way that it can absorb very high forces and also withstands long-term operation with slip with very low installation space and wear.

The object is achieved wherein the coaxial gear mechanisms have in each case one first element which is configured as an internal gear and is connected fixedly in terms of rotation to one side of the associated friction clutch, and one concentric second element which is connected fixedly in terms of rotation to the respective output element, and in that the second element is configured as a sun gear and a third element is configured as an annular gear, the axis of which is offset with regard to the axis of the first and the second elements, and which has an external toothing system which meshes with the first element and an internal toothing system which meshes with the second element.

Therefore, a simple coaxial gear mechanism with a very narrow construction is provided on both sides in the immediate vicinity of the clutch, which results overall in favorable force profiles, saves installation space and permits a common supply with lubricating/cooling oil. The annular gear surrounds the sun gear eccentrically, in the manner of an oil conveying ring in a sliding bearing of classic design, it being possible for said annular gear also to actually perform this action. Although this particular gear mechanism design is known per se, see, for instance, the patents U.S. Pat. Nos. 1,619,127 or 773,227, it is not known in conjunction with friction clutches for torque distribution control and with the object on which the invention is based.

This gear mechanism design allows the transmission ratios which are favorable for this purpose to be realized in a very small space, for geometrical reasons and because internal toothing systems result in very high degrees of overlap (a large number of teeth are in engagement at the same time, over which the forces which are to be transmitted are distributed). The high degree of overlap also permits a particularly narrow and therefore space-saving configuration of the toothed elements. The transmission ratios which are possible with this permit an optimum design of the friction clutch for the corresponding differences in rotational speed, which contributes to the protection of said friction clutch and, in conjunction with satisfactory lubrication/cooling, makes said friction clutch particularly suitable for long-term slip operation.

In one development of the invention, the friction clutches comprising in each case a primary part which carries inner disks and a secondary part (the outer part) which carries outer disks, the secondary part of the clutch is combined structurally with the first element of the respective coaxial gear mechanism. Simple and narrow assemblies are therefore produced which are identical for both sides and can also be adapted and used easily for different transmission ratios in a modular design. Particularly favorable conditions for the mounting of the rotating parts are also provided by the combination of both components and the small extent in the axial direction.

This is particularly true if the secondary part of the clutch forms a bell, the respective coaxial gear mechanism adjoining the axially normal part of said bell, and the annular gear having a collar on its side (the outer side) which faces away from the clutch, which collar is mounted in the housing. The annular gear is therefore a particularly simple part and is mounted precisely and fixedly in the housing. Further space is saved and further costs are reduced by the fact that the collar of the annular gear is itself a bearing ring of a roller bearing.

In one particularly advantageous development of the invention, the coaxial gear mechanisms (28, 29) are configured with their adjacent wall parts as gearwheel oil pumps. Therefore, in addition to its gear mechanism function, the coaxial gear mechanism also acts as an oil pump. For this purpose, the crescent-shaped recesses in the adjacent walls which are known from gerotor pumps can be provided. In one special embodiment, the coaxial gear mechanisms have a crescent-shaped block between the first and/or second element and the annular gear, and two openings are provided in an adjacent housing part, from which two openings oil channels lead away, a first channel for the supply of oil from an oil sump and a second channel which produces a connection to the respective clutch directly or indirectly. The conveying action of the annular gear is increased considerably in this way. As a result of this and the pump action, large amounts of lubricating/cooling oil can be conveyed to the respective friction clutch, which ensures its long-term operation under slip, even with a further increase in loading.

The oil which is conveyed in this way could also be supplied for other applications, for instance the loading of the friction clutches. For this purpose, only the valves and channels which are required to control oil circuits then have to be provided. The particular design of the gear mechanism even permits the conveying of oil in two crescent-shaped regions, in two pressure stages.

BRIEF DESCRIPTION OF THE DRAWINGS

In the following text, the invention will be described and explained using figures of one preferred embodiment of the invention, in which figures.

DETAILED DESCRIPTION

Figure 1:
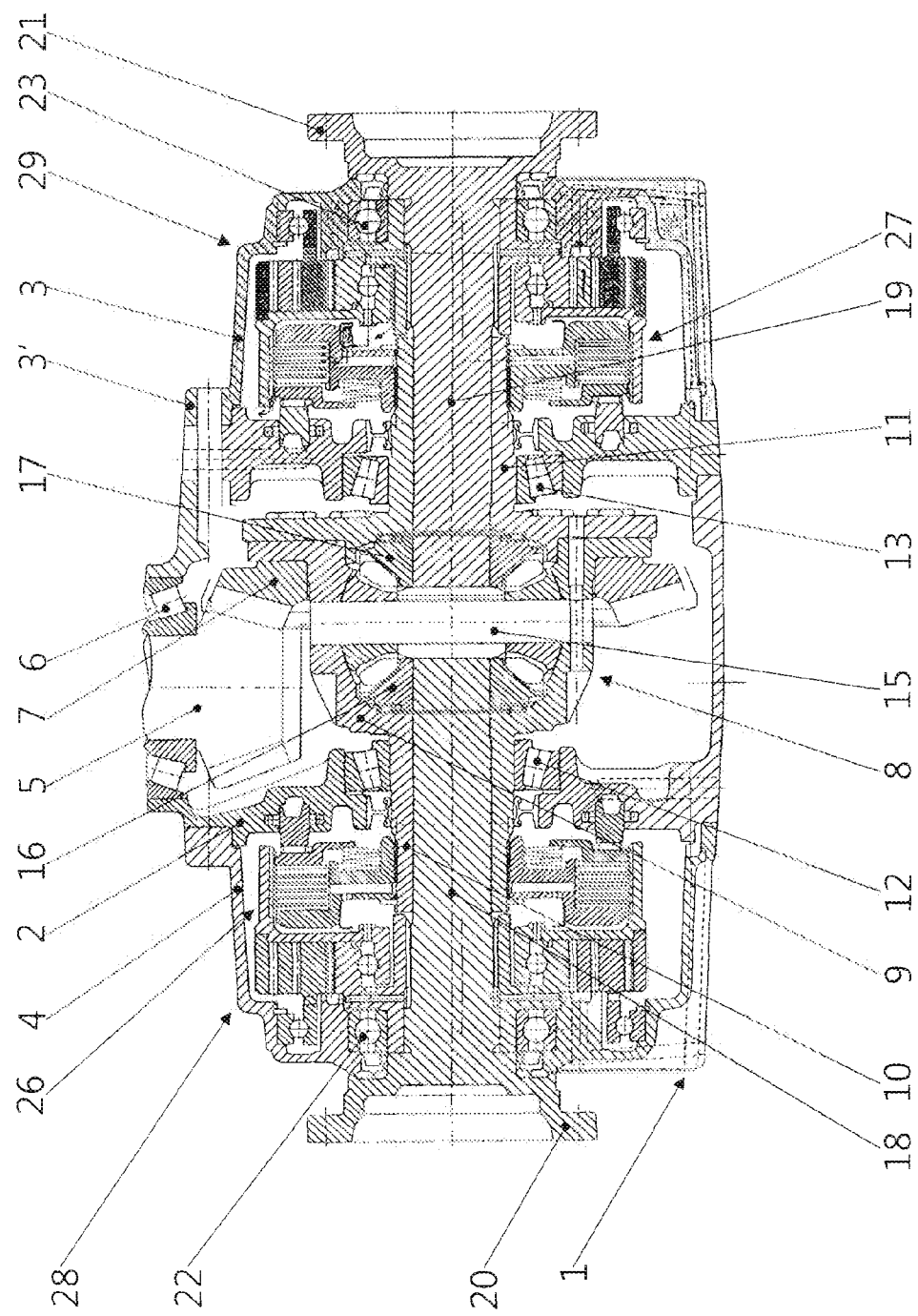
FIG. 1 shows a differential gear unit in axial section.

In FIG. 1, the housing of the differential gear unit according to the invention is denoted overall by 1. It comprises a center housing 2 and a right-hand and left-hand side housing 3, 4 which are screwed to the center housing 2 by way of a flange (such as, for example, 3'). The center housing 2 comprises a drive pinion 5, the one bearing 6 of which is indicated, a ring gear 7 which meshes with the drive pinion 5 and a differential which is connected fixedly in terms of rotation to the ring gear 7 and is denoted overall by 8.

As is customary, the differential 8 comprises a differential cage 9, a differential bolt 15 therein having differential bevel gears which are mounted on it, and a left-hand and a right-hand output bevel gear 16, 17. The differential cage 9 merges on both sides into a left-hand and a right-hand hollow shaft 10, 11 which are mounted in bearings 12, 13 in the center housing 2. The differential cage 9 with its two hollow shafts 10, 11 forms the driven element of the differential 8. There are a left-hand axle shaft 18 and a right-hand axle shaft 19 in the interior of the hollow shafts 10, 11. The axle shafts 18, 19 are the two output elements of the differential and in each case have a left-hand flange 20 and a right-hand flange 21, to which, for example, drive shafts which lead to the wheels of an axle are connected via homokinetic joints. The axle shafts 18, 19 are mounted in bearings 22, 23 in their respective side housings 3, 4. Furthermore, there are a left-hand friction clutch 26 and a left-hand coaxial gear mechanism 28 in the left-hand side housing 4, and a right-hand friction clutch 27 and a right-hand coaxial gear mechanism 29 in the right-hand side housing 3. Here, the term coaxial gear mechanisms represents fixed-shaft gear mechanisms, the input and output elements of which are coaxial. The two side housings 3, 4 with all their installed parts which will be described in the following text are identical.

Figure 2:
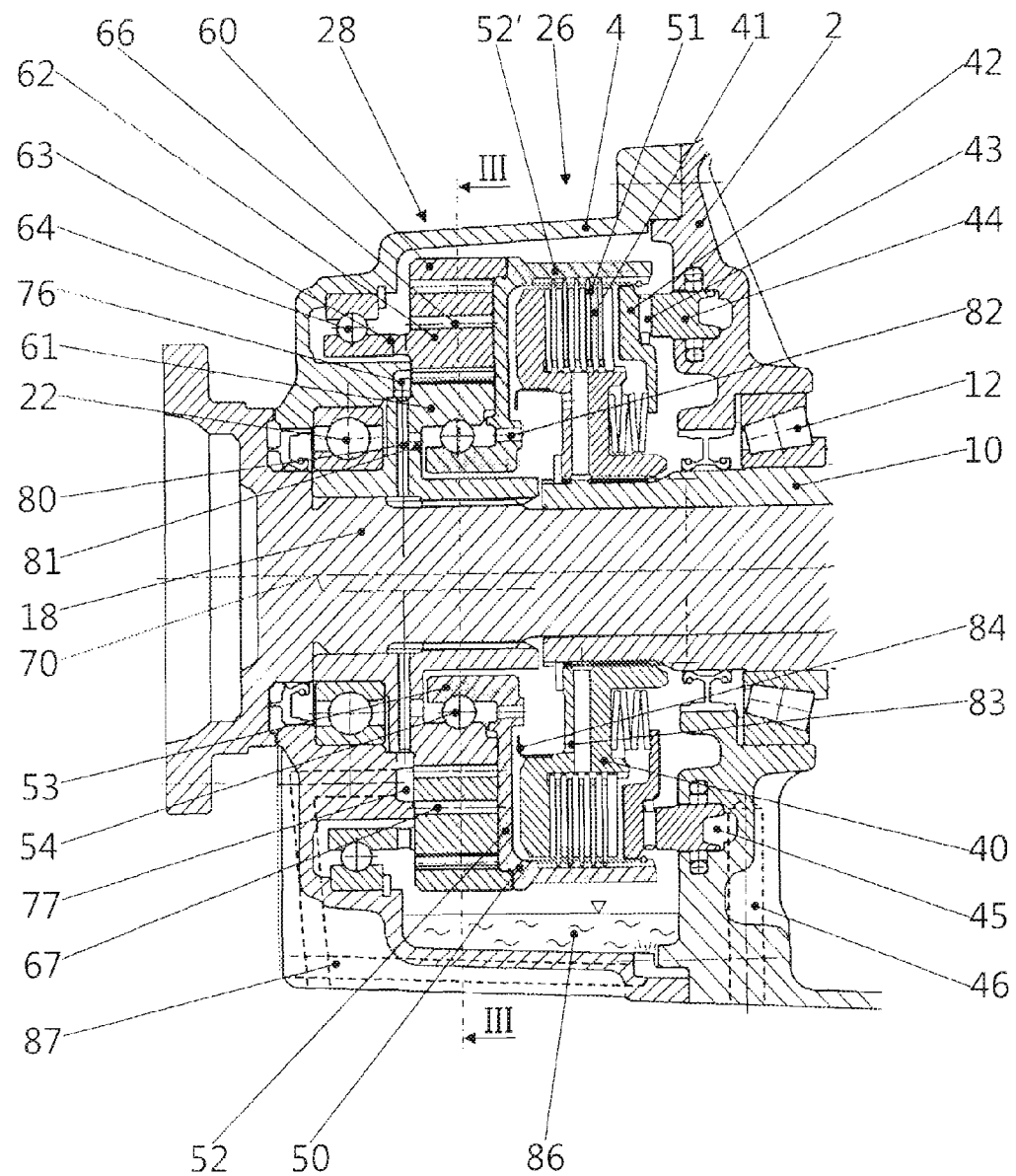
FIG. 2 shows detail A in FIG. 1, on an enlarged scale.

FIG. 2 shows the left-hand side housing 4 with its contents. The friction clutch 26 comprises a primary part 40 which is seated fixedly in terms of rotation on the left-hand hollow shaft 10 and a secondary part 50 which surrounds the former in the manner of a bell. The primary part 40 has primary disks 41 which are seated fixedly in terms of rotation on it and a pressure plate 42 which is loaded in a controllable manner by an annular piston 40 via a needle bearing 43. The annular piston 44 closes an annular pressure space 45, to which compressed oil is fed in a controlled manner via a pressure channel 46. Secondary disks 51 are attached fixedly in terms of rotation in the secondary part 50. The bell-shaped secondary part 50 comprises a base 52 which lies approximately in an axially normal plane and a cylindrical part 52' which accommodates the secondary disks. On its inner edge, the base 52 merges into a bearing flange 53 which is part of a groove ball bearing 54.

The coaxial gear mechanism 28 comprises an internal gear 60 having an internal toothing system, which internal gear 60 is connected fixedly in terms of rotation to the secondary part 50 of the friction clutch 26, a sun gear 61 which is connected fixedly in terms of rotation to the left-hand axle shaft 18, and an annular gear 62. The internal gear 60 which is mounted on the groove bearing 54 is the first element, the sun gear 61 is the second element and the annular gear 62 is the third element of the coaxial gear mechanism 28. The annular gear has an external toothing system 66 which meshes with the internal gear 60 and an internal toothing system 67 which meshes with the sun gear 61, and surrounds the sun gear 61. It is mounted eccentrically in the housing 4 by means of a groove ball bearing 64 and collar 63.

Figure 3:
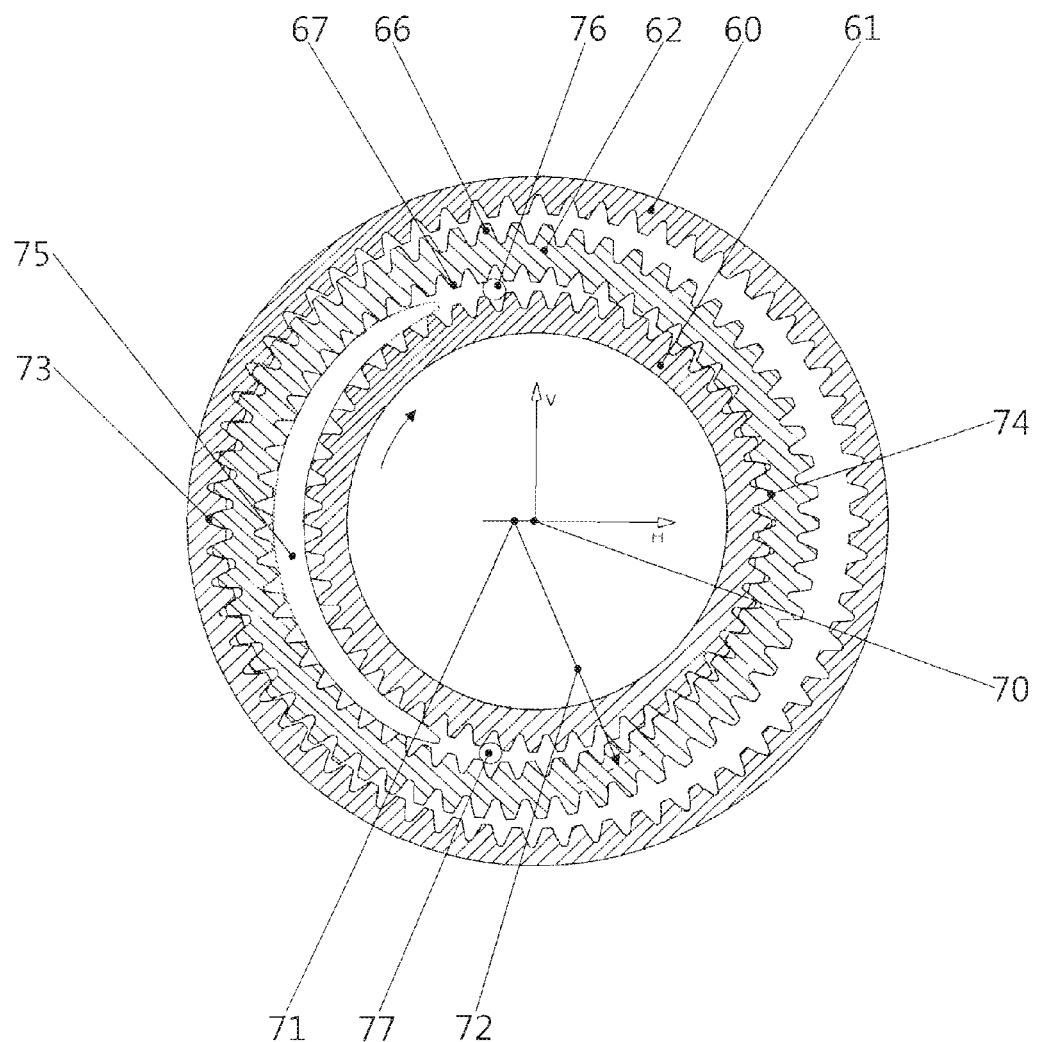
FIG. 3 shows the cross section according to III-III in FIG. 2.

This can be seen more clearly in FIG. 3. The rotational axis of the internal gear 60 and the sun gear 61 is denoted by 70, the axis of the annular gear 62 and its groove ball bearing 64 is denoted by 71, and the associated radius is denoted by 72. On account of the eccentricity of the axis 71, the external toothing system 66 meshes with the internal toothing system of the internal gear 60 in the vicinity of the point 73, and the internal toothing system 67 of the annular gear 62 meshes with the sun gear 61 in the vicinity of the point 74 which lies diametrically opposite. The crescent-shaped hollow space which is formed between the sun gear 61 and the annular gear 62 contains a crescent-shaped island 75. This island 75 is connected fixedly to the housing 4 which, furthermore, has a first opening 76 and a second opening 77 at points which are situated approximately diametrically opposite one another. The coaxial gear mechanism therefore acts as a gearwheel pump which sucks in oil through the opening 77 which lies on the lower side and emits it under pressure through the opening 76 which lies on the upper side.

These openings and the oil channels which adjoin them can be seen in FIG. 2. At least one lubricating oil channel 80 in the sun gear 61 leads radially inward from the first opening 76 with the interposition of an annular space which is small and therefore cannot be seen. The lubricating oil passes as coolant directly to the disks 41, 51 of the clutch 26 through further openings 81 in the sun gear 61, 82 in the base of the secondary part 52 of the clutch and 83 in the primary part of the clutch. An annularly circumferential oil retaining plate 84 which catches the oil which emerges from the opening 82 and guides it into the opening 83, assisted by centrifugal force, is provided in the primary part 40 of the friction clutch 26. Oil passes to the suction opening 77 from the sump 86 via a suction channel 87 which is guided in the housing, indicated with a dashed line.

The differential gear unit according to the invention operates as follows: in the neutral state, that is to say when the clutches 26, 27 are completely open, the motive force is distributed in the known manner by the differential 8 to the two axle shafts 18, 19. The latter and, with them, the respective sun gear rotates at the rotational speed which is set via the differential 8. In relation to the left-hand axle shaft 18, the sun gear 61 drives its internal gear 60 and therefore the secondary part 50 of the clutch 26 via the transmission of the coaxial gear mechanism 28 in an idling manner at a relatively low rotational speed, as the clutch 26 is of course completely open. If the torque which is fed to the left-hand axle shaft 18 is then to be increased, the clutch 26 is actuated in the closing direction to the required extent, as a result of which the secondary part 50 of the clutch which rotates at the beginning more slowly than the primary part 40 of the clutch is also driven. Here, a torque is transmitted to it. Said torque is introduced via the coaxial gear mechanism 28 into its sun gear 61 and therefore as an additional torque to the left-hand axle shaft 18.

The transmission ratio of the coaxial gear mechanisms and their configuration can be adapted within a wide range to the possible driving dynamic requirements of a motor vehicle. A transmission ratio of the order of magnitude which is required for this purpose has been made possible structurally on account of the particular design of the coaxial gear mechanisms 28, 29 with an optimum configuration of the toothing system. It is to be noted as a side issue that the differential gear unit according to the invention can also transmit torques between the two axle shafts without drive by a corresponding actuation of the friction clutches.

The above-described differential gear unit is one exemplary embodiment, from which many deviations can be made. For instance, the bevel gear differential 8 can be replaced by a differential of another design, such as a parallel-axle planetary differential. The above-described differential gear unit can be used not only as an axle differential but also as a central differential, that is to say for distributing a motive force to two axles of a motor vehicle. In this case, the differential can also bring about a non-equal force distribution.

The invention claimed is:

1. Differential gear unit for motor vehicles, comprising a housing and, therein, a differential gear mechanism, two coaxial gear mechanisms and two controllable friction clutches, the differential gear mechanism comprising an element which can be driven and a first and second output element for outputting torque, and the coaxial gear mechanisms transmitting an additional torque to the first and second output elements according to the degree of engagement of the friction clutches, wherein
   a) each coaxial gear mechanism comprises one first element which is configured as an internal gear and is connected fixedly in terms of rotation to one side of the associated friction clutch, and one second element which is connected fixedly in terms of rotation to the respective output element, and
   b) the second element of each coaxial gear mechanism is a sun gear, and a third element is configured as an annular gear having an axis of rotation which is offset with regard to an axis of rotation of each of the first and the second elements, and which has an external toothing system which meshes with the first element and an internal toothing system which meshes with the second element; and wherein each friction clutch comprises a primary part which carries inner disks and a secondary part which carries outer disks, wherein the secondary part is combined structurally with the first element of the respective coaxial gear mechanism.

2. Differential gear unit according to claim 1, wherein the secondary part of the clutch comprises a bell-shaped secondary part, the respective coaxial gear mechanism adjoining the axially normal part of said bell-shaped secondary part, and the annular gear has a collar on its side which faces away from the clutch, the collar is mounted in the housing.

3. Differential gear unit according to claim 2, wherein the collar of the annular gear is itself a bearing ring of a roller bearing.

4. Differential gear unit according to claim 3, wherein the coaxial gear mechanisms are configured with their adjacent wall parts to form gearwheel oil pumps.

5. Differential gear unit according to claim 4, wherein the coaxial gear mechanisms have a crescent-shaped island between the first and/or the second element and the annular gear, and in that two openings are provided in an adjacent part of the housing, from which two openings oil channels lead away, a first channel for the supply of oil from an oil sump and a second channel which produces a connection to the respective clutch directly or indirectly.

6. Differential gear unit according to claim 5, wherein the crescent-shaped island is formed between the second element and the annular gear and is fastened to the housing.

\* \* \* \* \*